US008858901B2

(12) United States Patent
Morel et al.

(10) Patent No.: US 8,858,901 B2
(45) Date of Patent: Oct. 14, 2014

(54) USE OF A KMGF₃ COMPOUND FOR TRAPPING METALS IN THE FORM OF FLUORIDES AND/OR OXYFLUORIDES IN A GASEOUS OR A LIQUID PHASE

(75) Inventors: Bertrand Morel, Saint Paul Trois Chateaux (FR); Lorraine Leite, Saint Marcel d'Ardeche (FR); Laurent Moch, Bourg Saint Andeol (FR); Alain Demourgues, Pessac (FR); Romain Clarenc, Beaudean (FR); Alain Tressaud, Pessac (FR); Etienne Durand, Cursan (FR)

(73) Assignee: COMURHEX Société pour la Conversion de l'Uranium en Métal et Hexafluorure, Pierrelatte (FR)

( * ) Notice: Subject to any disclaimer, the term of this patent is extended or adjusted under 35 U.S.C. 154(b) by 0 days.

(21) Appl. No.: 14/124,545

(22) PCT Filed: Jun. 8, 2012

(86) PCT No.: PCT/EP2012/060875
§ 371 (c)(1),
(2), (4) Date: Dec. 6, 2013

(87) PCT Pub. No.: WO2012/168420
PCT Pub. Date: Dec. 13, 2012

(65) Prior Publication Data
US 2014/0112846 A1  Apr. 24, 2014

(30) Foreign Application Priority Data
Jun. 9, 2011 (FR) ...................... 11 55055

(51) Int. Cl.
| | | |
|---|---|---|
| B01D 53/64 | (2006.01) | |
| B01D 53/68 | (2006.01) | |
| C01B 9/08 | (2006.01) | |
| C02F 1/62 | (2006.01) | |
| B01J 20/30 | (2006.01) | |
| C01F 5/28 | (2006.01) | |
| B01J 20/28 | (2006.01) | |
| C01D 3/02 | (2006.01) | |
| B01D 53/02 | (2006.01) | |
| C01G 43/06 | (2006.01) | |
| C22B 60/02 | (2006.01) | |
| B01J 20/04 | (2006.01) | |

(52) U.S. Cl.
CPC ......... *C22B 60/0278* (2013.01); *B01J 20/3085* (2013.01); *B01J 20/3028* (2013.01); *C01F 5/28* (2013.01); *B01J 20/28057* (2013.01); *C01D 3/02* (2013.01); *B01D 53/685* (2013.01); *B01D 2251/402* (2013.01); *C01P 2002/82* (2013.01); *Y02C 20/30* (2013.01); *B01D 53/02* (2013.01); *B01J 20/3078* (2013.01); *C01G 43/063* (2013.01); *C01P 2002/72* (2013.01); *B01D 2251/306* (2013.01); *B01J 20/28004* (2013.01); *B01J 20/046* (2013.01); *C01P 2006/12* (2013.01); *C22B 60/0213* (2013.01)
USPC ............ 423/3; 423/210; 423/240 S; 423/258; 423/464; 210/682; 210/688

(58) Field of Classification Search
USPC ........... 423/3, 464, 210, 258, 240 S; 210/682, 210/688
See application file for complete search history.

(56) References Cited

U.S. PATENT DOCUMENTS

| | | | | |
|---|---|---|---|---|
| 2,806,002 | A | * | 9/1957 | Smith .................... 252/301.6 R |
| 2,899,321 | A | * | 8/1959 | Mockrin ...................... 501/151 |
| 3,178,258 | A | | 4/1965 | Cathers et al. |
| 3,238,015 | A | * | 3/1966 | Pessahovitz et al. ......... 423/464 |
| 3,625,661 | A | | 12/1971 | Anderson et al. |
| 4,364,906 | A | | 12/1982 | Jones et al. |
| 5,826,163 | A | | 10/1998 | Saraceno et al. |
| 2008/0000413 | A1 | * | 1/2008 | Nawata et al. .................. 117/31 |
| 2013/0280157 | A1 | | 10/2013 | Morel et al. |

FOREIGN PATENT DOCUMENTS

GB       1 051 608     12/1966

OTHER PUBLICATIONS

French Preliminary Search Report issued Jan. 12, 2012, in French Patent Application No. 1155055 with English translation of category of cited documents.
Murthy, K., et al., "Sol-gel-fluorination synthesis of amorphous magnesium fluoride", Journal of Solid State Chemistry, vol. 179, No. 3., pp. 739-746, XP005300813, (Mar. 2006).
Patil, P., et al., "Non-aqueous sol-gel synthesis, characterization and catalytic properties of metal fluoride supported palladium nanoparticles" Applied Catalysis B: Environmental, vol. 78, No. 1-2, pp. 80-91, XP022387104, (Dec. 2007).
International Search Report Issued Sep. 11, 2012 in PCT/EP12/060875 Filed Jun. 8, 2012.

* cited by examiner

*Primary Examiner* — Timothy Vanoy
(74) *Attorney, Agent, or Firm* — Oblon, Spivak, McClelland, Maier & Neustadt, L.L.P.

(57) ABSTRACT

The invention relates to the use of a compound of the formula KmgF₃ to trap metals in the form of fluorides and/or of oxyfluorides in a gaseous or liquid phase. It also relates to a compound of the formula KMgF₃ which has a surface area at least equal to 30 m²/g and at most equal to 150 m²/g and also to its methods of preparation. The invention notably finds application in the nuclear industry, in which it can advantageously be used to purify uranium hexafluoride (UF₆) present in a gaseous or liquid stream, with regard to metal impurities which are also present in this stream.

19 Claims, 3 Drawing Sheets

USE OF A KMGF$_3$ COMPOUND FOR TRAPPING METALS IN THE FORM OF FLUORIDES AND/OR OXYFLUORIDES IN A GASEOUS OR A LIQUID PHASE

TECHNICAL FIELD

The present invention relates to the field of trapping of metallic species.

More specifically, it relates to the use of a magnesium and potassium trifluoride (called hereinafter the "KMgF$_3$ compound") to trap metals present in the state of fluorides and/or oxyfluorides in a gaseous or liquid phase.

It also relates to a KMgF$_3$ compound having a high surface specific area and to methods enabling this compound to be prepared.

The invention notably finds application in the nuclear industry, in which it can advantageously be used to purify uranium hexafluoride (UF$_6$) present in a gaseous or liquid stream, with regard to metal impurities which are also present in this stream.

STATE OF THE PRIOR ART

The nuclear fuel cycle designates all the steps which, from extraction of the uranium ore to the storage of the waste, enable fuels to be provided to nuclear reactors in order to generate distributable electrical energy.

This cycle includes a step which consists in converting the uranium extracted from the mines, concentrated in the form of yellow cake, into uranium hexafluoride whilst giving it the degree of purity essential for the manufacture of nuclear fuels.

This degree of purity is currently set by the ASTM C787 standard, under which the uranium hexafluoride must typically contain less than 1 ppm of impurities.

But yellow cake may contain several thousands of ppm of impurities with volatile fluorides and/or oxyfluorides, in particular those of molybdenum (Mo), vanadium (V) and tungsten (W).

The nuclear fuel cycle as it is implemented in France also includes a step intended to convert uranyl nitrate derived from the reprocessing of spent fuels into uranium hexafluoride with a view to re-using it as a raw material in the manufacture of new fuels.

In this case also, the uranium hexafluoride resulting from this conversion must satisfy the requirements of the ASTM C787 standard.

The uranyl nitrate derived from the reprocessing of spent nuclear fuels itself also contains several tens of ppb of impurities with volatile fluorides and/or oxyfluorides, such as those of technetium (Tc), neptunium (Np) and plutonium (Pu).

Several approaches to the purification of uranium hexafluoride have been explored.

In particular it is possible to:
a) purify the uranium by liquid-liquid extraction in a nitric or sulphuric acid medium, but this technique has the disadvantage that it generates large quantities of effluents which must be processed;
b) distill the uranium hexafluoride, but this technique implies that columns several tens of meters high are installed, and that the impurities produced by this distillation must be managed;
c) selectively precipitate the uranium as uranium tetroxide (UO$_4$) by reaction with hydrogen peroxide, but this technique proves to be ineffective in purifying uranium with regard to the metallic impurities which may form peroxides, such as vanadium, titanium (Ti) and zirconium (Zr);
d) purify the uranium hexafluoride by passing the medium in which it is present through a trap able to retain the impurities which it is desired to remove from it.

It has been shown that traps consisting of magnesium difluoride (MgF$_2$), aluminium trifluoride (AlF$_3$), sodium fluoride (NaF) or again calcium difluoride (CaF$_2$) are able, when they have a sufficient surface specific area, to retain vanadium pentafluoride (VF$_5$) and vanadium trifluoride oxide (VOF$_3$).

In addition, it has been shown that magnesium difluoride is also able to retain titanium tetrafluoride (TiF$_4$), niobium pentafluoride (NbF$_5$), tantalum pentafluoride (TaF$_5$) and antimony pentafluoride (SbF$_5$), molybdenum hexafluoride (MoF$_6$) and technetium fluorides. The use of magnesium difluoride to decontaminate uranium hexafluoride of technetium is moreover described in U.S. Pat. No. 5,826,163 (reference [1]).

However, in the course of their work, the inventors observed that the use of traps consisting of magnesium difluoride cannot be envisaged to purify uranium hexafluoride on an industrial scale, notably since magnesium difluoride retains a quantity of uranium hexafluoride practically equivalent to that of the fluorides and oxyfluorides which it is desired to remove from it.

This causes a rapid fouling of these traps, implying that they must be frequently replaced by new traps.

The inventors therefore set themselves the general aim of finding a material enabling the impurities present in uranium hexafluoride derived from the conversion of yellow cake or of reprocessing uranyl nitrate to be trapped, and which has none of the disadvantages posed by magnesium difluoride.

In particular, they set themselves the aim that this material should be capable of sufficiently trapping impurities present in uranium hexafluoride, in order for the latter to satisfy standard ASTM C787, but without however trapping uranium hexafluoride itself, or only slightly.

They also set themselves the aim that this material should be able to be used to purify uranium hexafluoride both when the latter is in a liquid phase and when it is in a gaseous phase.

They set themselves the further aim that this material should be commercially available or, failing this, that it should be able to be prepared by methods which are simple to use, at costs compatible with industrial exploitation.

DESCRIPTION OF THE INVENTION

These aims are attained by the present invention, which proposes to use a KMgF$_3$ compound to trap metals present in the form of fluorides and/or oxyfluorides in a gaseous or liquid phase.

In the course of their work, the inventors observed, indeed, that KMgF$_3$ compounds are able, when brought in contact with a gaseous or liquid phase, in which metals such as technetium, rhenium, vanadium, molybdenum, niobium, tantalum, antimony and titanium are present in the form of fluorides and/or oxyfluorides, to retain these metals very effectively.

And they also observed that, conversely, these compounds retain uranium hexafluoride only slightly, or only very slightly.

The use of KMgF$_3$ compounds is consequently of very particular interest for purifying uranium hexafluoride and, in particular, uranium hexafluoride resulting from the conversion of natural uranium or from the conversion of uranium derived from the reprocessing of spent nuclear fuels.

In accordance with the invention, the $KMgF_3$ compound preferably has a surface specific area equal to or greater than 30 $m^2/g$ as determined by the Brunauer, Emmett and Teller method, better known by the name "BET method", on this compound in a powder state. Indeed, the inventors observed that the trapping capacities of $KMgF_3$ compounds are better when the surface specific area of these compounds is at least this value.

However, it is preferable for the surface specific area of the $KMgF_3$ compound not to exceed 150 $m^2/g$, the value above which its chemical stability starts to be compromised, which becomes a hindrance to its use in trapping metals.

The $KMgF_3$ compound therefore typically has a surface specific area ranging from 30 to 150 $m^2/g$ and, better still, from 70 to 120 $m^2/g$.

In the context of the invention the $KMgF_3$ compound may be used in the form of a free powder. However, it is preferred, for reasons relating to pressure drops in the devices (for example, of the column type) in which it will be used, that this compound should be in the form of solid elements obtained by methods conventionally used for transforming powders, of the agglomerate, granulates, pellet or comparable types.

Thus, for example, the use of a $KMgF_3$ compound in the form of pellets, the largest dimension of which is equal to at most 3 mm and, notably, pellets the dimensions of which range from 2 to 3 mm, has proved to be particularly advantageous.

Furthermore, the $KMgF_3$ compound may be used alone or jointly with another compound known to have capacities for trapping chemical species and, in particular, fluorinated and/or oxyfluorinated metallic species. Thus, for example, the $KMgF_3$ compound may be used in combination with magnesium difluoride, in which case it is preferred that the mass fraction of the $KMgF_3$ compound in the $KMgF_3/MgF_2$ blend is at least equal to 0.2.

Whatever the form in which it is used, the $KMgF_3$ compound is able to trap metals present in a gaseous or liquid phase in the state of fluorides and/or of oxyfluorides as soon as it is brought into contact with this phase.

Nevertheless, to optimise its trapping capacities, it is preferred to subject it, prior to its use, to a fluoridation treatment which enables the quantity of uranium retained to be reduced.

This fluoridation treatment may be implemented by bringing the $KMgF_3$ compound into contact with either pure fluorine, or a blend including fluorine and one or more other gases chosen from among the inert gases such as, for example, dinitrogen or argon, and the fluorine-based gases such as, for example, a blend of fluorine, argon and hydrofluoric acid. Thus, for example, the fluoridation treatment may be accomplished by using a blend of fluorine, dinitrogen and hydrofluoric acid.

The fluoridation treatment may be undertaken at a temperature ranging from ambient temperature to 500° C., with preference for temperatures of between 200 and 300° C.

In addition, the $KMgF_3$ compound is preferably used, i.e. brought into contact with the gaseous or liquid phase, at a temperature ranging from 80 to 200° C., with the understanding that it may also be used at other temperatures and, notably, at ambient temperature, i.e. at the temperature prevailing in the environment in which it is planned to use it.

In accordance with the invention, this contact action is maintained for a minimum period of 20 seconds, ranging, preferably, from 60 to 300 seconds in the case of a gaseous phase, and from 60 to 600 seconds in the case of a liquid phase, depending on the impurities.

The $KMgF_3$ compound useful according to the invention may be prepared by methods which are easy to implement.

It may thus be obtained, notably, by:
reacting a magnesium compound, for example magnesium diacetate tetrahydrate, with potassium bifluoride in solution in an alcohol or a blend of alcohols, in the presence of hydrofluoric acid, followed by
calcinating the product resulting from this reaction.

Assisted by microwave heating, preferably within a range of temperatures of 100 to 200° C., this reaction leads to the production of $KMgF_3$ compounds with a high surface specific area, typically equal to or greater than 100 $m^2/g$, as determined by the BET method.

As a variant, it may also be obtained by impregnating magnesium difluoride, preferably with a high surface specific area, by an aqueous solution including potassium bifluoride and, possibly, hydrofluoric acid, where this impregnation is preferentially accomplished at a temperature of the order of 50 to 70° C. Depending on the stoichiometric conditions, the product obtained may consist solely of $KMgF_3$, or of a blend of $KMgF_3$ and of $MgF_2$. With this regard, it has been observed that a $KF/MgF_2$ ratio greater than 1.1 is required to obtain the product the characterisation of which by X-ray diffraction shows that it consists solely of $KMgF_3$.

Another object of the invention is a method of preparing a $KMgF_3$ compound having a surface specific area at least equal to 30 $m^2/g$ and at most equal to 150 $m^2/g$ (as determined by the BET method), which comprises:
reacting a magnesium compound with potassium bifluoride in solution in an alcohol or a blend of alcohols, in the presence of hydrofluoric acid, followed by
calcinating the product resulting from this reaction.

Another of its objects is a second method of preparing this compound, which comprises impregnating magnesium difluoride by an aqueous solution including potassium bifluoride and, possibly, hydrofluoric acid.

Other characteristics and advantages of the invention will appear from the additional description below, which relates to examples of preparation of $KMgF_3$ compounds of use according to the invention, and from the determination of their properties.

This additional description is of course given solely for the purpose of illustrating the invention, and in no way constitutes a limitation of it.

DETAILED DESCRIPTION OF PARTICULAR EMBODIMENTS

Example 1

Figure 1:
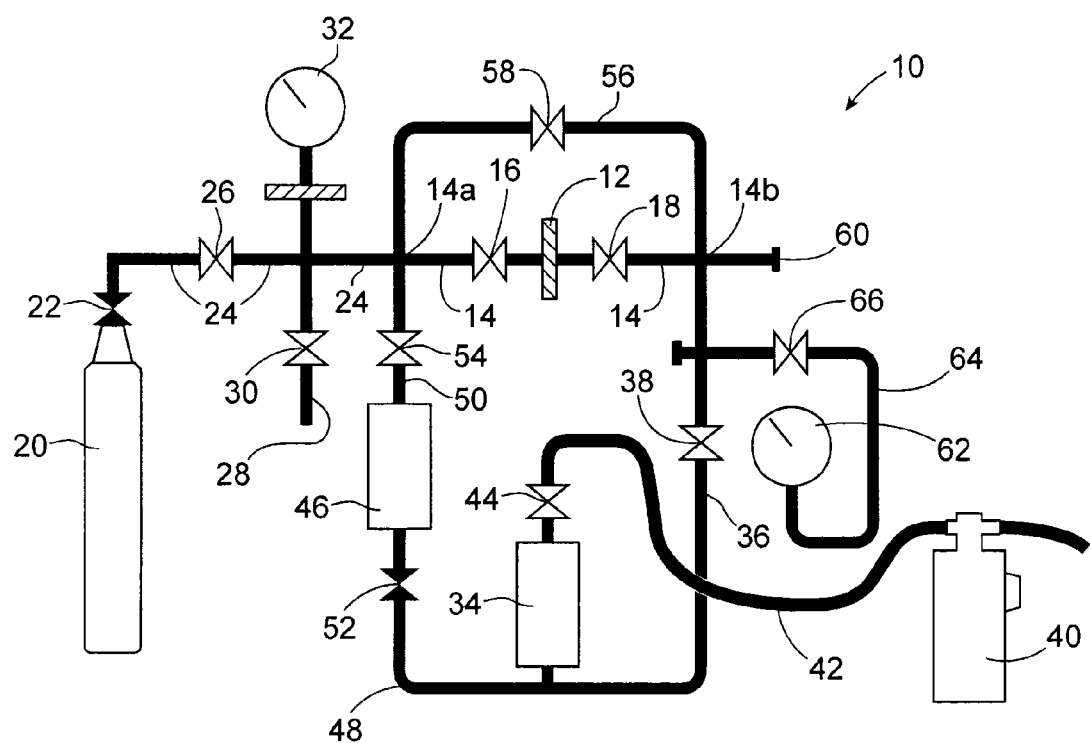
FIG. 1 is a schematic diagram of an experimental device which enabled the inventors to assess the ability of $KMgF_3$ compounds to be used as traps with regard to fluorides and oxyfluorides present in the gaseous phase.

Preparation of a $KMgF_3$ Compound Assisted by Microwaves

In a 100 mL reactor made of polytetrafluoroethylene (Teflon™), the following are introduced: 40 mL of isopropanol, 1.8 g of magnesium diacetate tetrahydrate ($Mg(CH_3COO)_2 \cdot 4H_2O$), 0.71 g of potassium bifluoride (KF,HF), 360 mL of 40% liquid hydrofluoric acid (HF), and a magnetic stirrer.

The reactor is closed and then placed in a bracket enabling the pressure and temperature present in this reactor to be controlled.

The bracket is itself placed in a microwave oven which is sold by the company CEM with the commercial name Mars 5™. This oven, which operates at a frequency of 2.45 GHz, is set to a power level of 300 W and programmed to reach a temperature of 150° C. in 5 minutes and remain at this temperature for 1 hour.

The synthesis product obtained at this stage is then centrifuged for 10 minutes at 5000 revolutions per minute (rpm) and then dried for 2 hours in a stove at 100° C. It is then calcinated for 5 hours at 300° C.

A product in powder form is then obtained, consisting of $KMgF_3$, and having a surface specific area of 120 $m^2/g$, as determined by the BET method.

Example 2

Preparation of a $KMgF_3$ Compound by Impregnation

In the present example, the preparation of a $KMgF_3$ compound is accomplished by a method known as the "impregnation method". It is undertaken according to the following protocol.

7.1 g of potassium bifluoride (KF,HF) is dissolved in 10 mL of water.

5.2 g of magnesium difluoride ($MgF_2$) of surface specific area equal to 80 $m^2/g$ is then added to this solution.

The suspension obtained in this manner is then stirred for 4 hours at 60° C., and then placed for 48 hours at an ambient temperature.

The resulting product is then dried at 100° C. in a stove, washed with 200 mL of water, centrifuged for 10 minutes at 5000 rpm, dried again at 100° C. in the stove and then calcinated for 5 hours at 200° C.

A product in powder form is then obtained, consisting of $KMgF_3$, and having a surface specific area of 30 $m^2/g$, as determined by the BET method.

Example 3

Assessment of the Ability of a $KMgF_3$ Compound to Trap Technetium Hexafluoride ($TcF_6$) and Characterisation of the Products Formed During this Trapping The present example relates to a test intended to assess the ability of a $KMgF_3$ compound to trap $TcF_6$, and to characterise the products resulting from the reaction of the $KMgF_3$ compound with technetium hexafluoride.

As technetium is a radioactive element, the test is undertaken using rhenium hexafluoride which has the same chemical properties as technetium hexafluoride—since rhenium and technetium indeed belong to the same column (VIIB) of the periodic table of the elements or Mendeleïev's table—but is more stable than it.

This test consists in causing a gaseous stream of rhenium hexafluoride to flow over a sample of the $KMgF_3$ compound in a device which has been previously had all trace of moisture removed from it to prevent the rhenium hexafluoride from hydrolysing, and in then characterising by X-ray diffraction and by Fourier transform infrared (FT-IR) spectroscopy the compounds resulting from the reaction of the $KMgF_3$ compound with the rhenium hexafluoride.

This test is accomplished using:
- a $KMgF_3$ compound in powder form, which has been prepared as described in Example 1 above; and
- experimental device 10 which is illustrated schematically in FIG. 1.

As this figure shows, this device includes a detachable sample-holder 12, which is positioned in the path of a pipe 14, in which the $KMgF_3$ compound is intended to be placed. Pipe 14 is fitted with two quarter-turn valves, respectively 16 and 18, which are located either side of sample-carrier 12, and which enable the latter to be isolated from the remainder of the device, notably in order to install it and to remove it.

End 14a of pipe 14 is connected to a first circuit which enables the device to be supplied with rhenium hexafluoride firstly, and with argon secondly.

This first circuit includes:
- a bottle 20, which contains pressurised rhenium hexafluoride, which is fitted with a pressure reducing valve, itself fitted with a quarter-turn valve 22, which is connected to end 14a of pipe 14 by a pipe 24 fitted with a quarter-turn valve 26;
- an argon intake 28, which emerges in pipe 24, and which is fitted with a quarter-turn valve 30; and
- a precision manometer 32, which enables the pressure at which the rhenium hexafluoride or the argon is introduced into the device to be controlled.

Each of ends 14a and 14b of pipe 14 is connected to a second circuit which notably enables the device to be evacuated and, at the end of the test, enables any rhenium hexafluoride which has not reacted with the $KMgF_3$ compound to be eliminated.

This second circuit includes:
- a trap 34 made of sodium fluoride, which is connected to end 14b of pipe 14 by a pipe 36 fitted with a quarter-turn valve 38;
- a cold trap 40 which is connected, firstly, to trap 34 by a pipe 42 fitted with a quarter-turn valve 44 and, also, to a vacuum pump (not represented in FIG. 1);
- a cell 46 for mixing gases, which is connected, firstly, to trap 34 by a pipe 48 and also to end 14a of pipe 14 by a pipe 50, where each of pipes 48 and 50 is fitted with a quarter-turn valve, respectively 52 and 54; and
- a pipe 56, which directly connects ends 14a and 14b of pipe 14 and which is fitted with a quarter-turn valve 58.

The device also includes a thermocouple 60 enabling the temperature present in the interior of this device to be controlled, and a manometer 62, which is connected to pipe 36 by a pipe 64 fitted with a quarter-turn valve 66, and which enables the pressure present in this second circuit to be controlled.

Sample-holder 12 consists of a series of stainless steel washers placed one after another, inside which the $KMgF_3$ compound is placed, and which are positioned between sintered nickel filters to prevent the powder from being conveyed outside this sample-holder, notably due to the vacuum.

Prior to the test the $KMgF_3$ powder is treated by a gaseous stream consisting 10% of fluorine and 90% of argon (v/v) for 5 hours.

Figure 2:
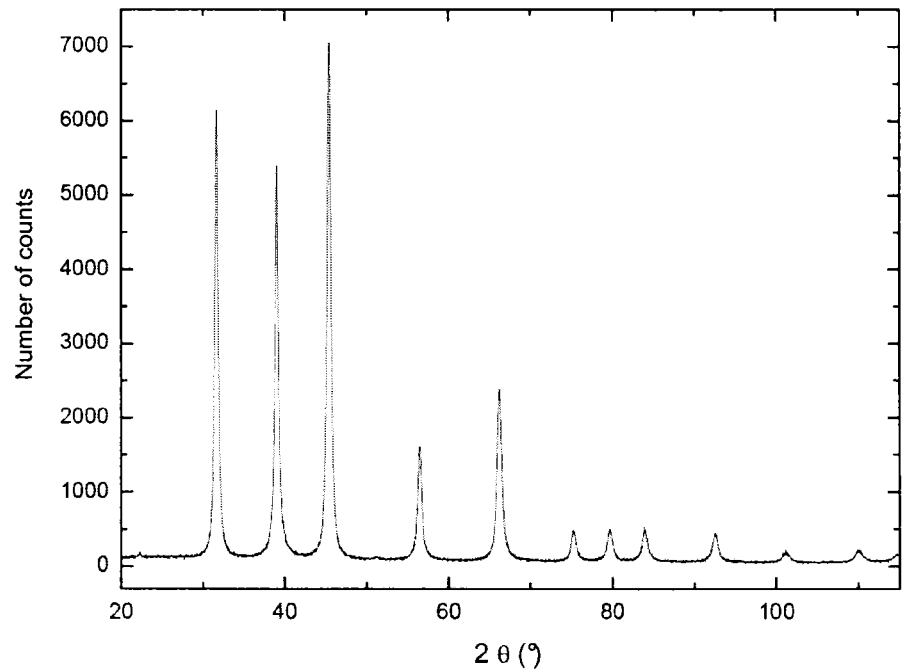
FIG. 2 represents the X-ray diffraction spectrum of a $KMgF_3$ powder before this powder is used to trap rhenium hexafluoride.

After this treatment the $KMgF_3$ powder has a surface specific area of approximately 100 $m^2/g$, as determined by the BET method, an oxygen rate of 2.2% by mass and crystallite sizes of 16 nm, as determined with the Fullprof application. In addition, it has the X-ray diffraction spectrum which is illustrated in FIG. 2.

The $KMgF_3$ powder prepared in this manner is introduced into sample-holder 12 in a dry atmosphere (i.e. in a totally dehumidified glovebox), to prevent the rhenium hexafluoride from hydrolysing. The mass of $KMgF_3$ powder introduced into sample holder 12 is 67.7 mg.

This sample-holder is then placed in device 10. At this moment, all the valves except for valves 26 and 30 are open, and the entire device is placed in a dynamic primary vacuum for 30 minutes to eliminate all traces of moisture in this device.

After which traps 34 and 40, and also the vacuum pump, are isolated from the remainder of the device by closing valves 44, 38 and 52, and the device is once again in a static primary vacuum.

Valves 16 and 18 are closed to isolate the sample of $KMgF_3$. Valves 58 and 66 are also closed. Valves 22 and 26 are opened to introduce the rhenium hexafluoride into the device at a pressure of 150 mbar (15 kPa), this pressure being controlled using manometer 32.

Valves 22 and 26 are then reclosed, and valve 16 is then opened to put the sample of $KMgF_3$ in contact with the rhenium hexafluoride. The contact time is 1 hour and this contact is made at ambient temperature.

After which, valves 44, 38, 18, 60 and 52 are opened in succession, to establish a dynamic vacuum for 30 minutes, and to eliminate all traces of rhenium hexafluoride which have not reacted.

Sample-holder 12 is then isolated by closing valves 16 and 18, and the vacuum pump may then be stopped.

Sample-holder 12 is removed from device 10 and introduced into a glovebox in an inert atmosphere, in order to recover the powdered $KMgF_3$ which it contains. This powder is blue-grey in colour, whereas it was white before being introduced into sample-holder 12. Its mass is 94.8 mg, which is equivalent to a 40% mass increase.

The powder obtained in this manner is characterised by X-ray diffraction, firstly in a dry environment, and subsequently after contact with the ambient air.

Figure 3:
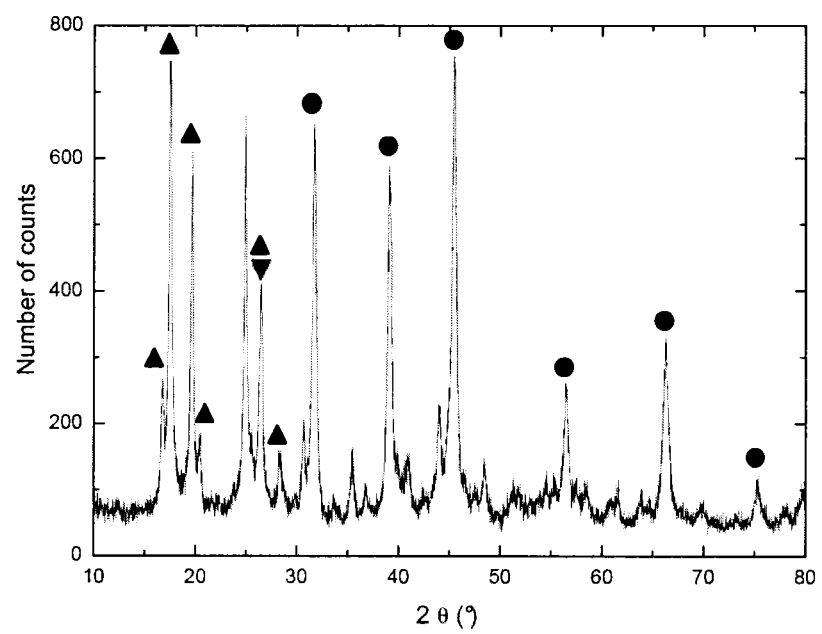
FIG. 3 represents the X-ray diffraction spectrum of the powder the X-ray diffraction spectrum of which is illustrated in FIG. 2, but after this powder has been used to trap rhenium hexafluoride and before it is brought back into contact with ambient air.
Figure 4:
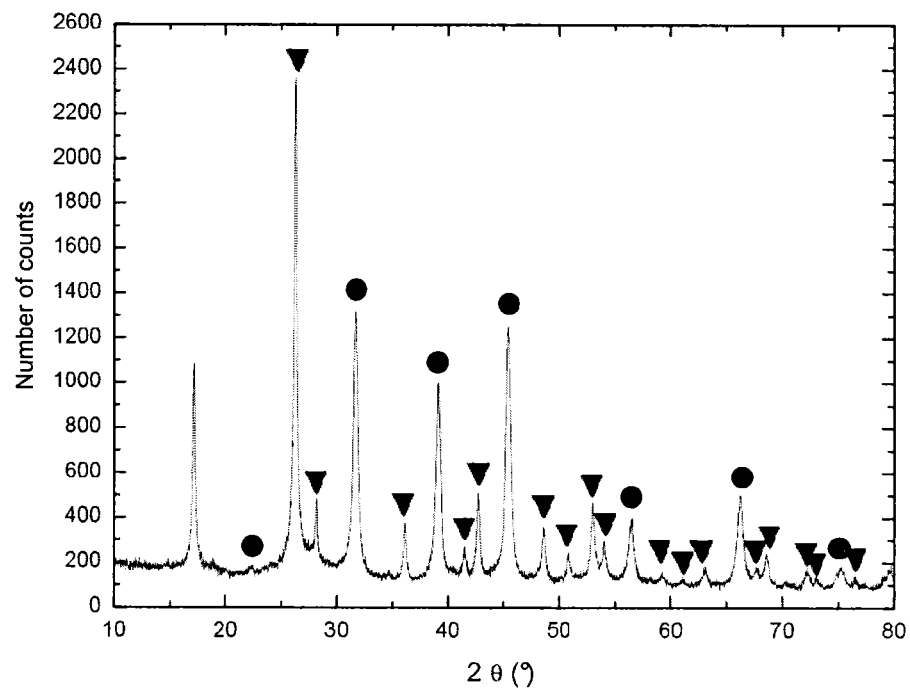
FIG. 4 represents the X-ray diffraction spectrum of the powder the X-ray diffraction spectrum of which is illustrated in FIG. 2, but after this powder has been used to trap rhenium hexafluoride and after it has been brought back into contact with ambient air.

The spectra obtained are represented in FIGS. 3 and 4.

Figure 5:
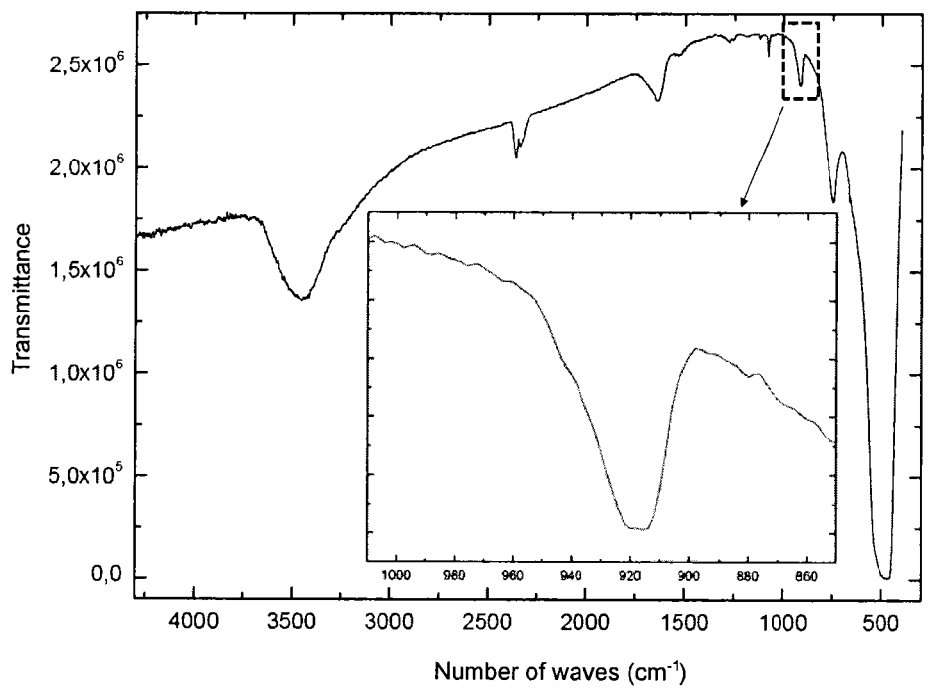
FIG. 5 represents the Fourier transform infrared spectrum (FT-IR) of the powder the X-ray diffraction spectrum of which is illustrated in FIG. 4.

The powder is also characterised by FT-IR and the spectrum obtained is represented in FIG. 5.

FIGS. 3 and 4 show that the $KMgF_3$ powder has indeed trapped the rhenium hexafluoride, since at least two phases have been formed within this powder, namely:

a first phase corresponding to potassium octafluororhenate ($K_2ReF_8$), the characteristic peaks of which are shown in FIGS. 3 and 4 by the symbol ▲; and a second phase corresponding to potassium perrhenate ($KReO_4$), the characteristic peaks of which are shown in FIGS. 3 and 4 by the symbol ▼;

the characteristic peaks of $KMgF_3$ are, for their part, shown in these figures by the symbol ●.

Other phases are present in the powder, since certain diffraction peaks, which correspond neither to $KMgF_3$ nor to $K_2ReF_8$ nor to $KReO_4$, are present on the spectrum illustrated in FIG. 3, but these phases have not been identified.

A comparison of FIGS. 3 and 4 also shows that, if the powder is put into direct contact with the ambient air after trapping of $ReF_6$, since the $K_2ReF_8$ phase and the other phases which are present are very unstable, they are crystallised in the form of $KReO_4$.

Finally, when they are brought back into contact with air, the presence of rhenium in the form of $KReO_4$ may be characterised, as shown by FIG. 5, by FT-IR, with the appearance of an adsorption band around 920 $cm^{-1}$, corresponding to an Re—O bond.

Example 4

Assessment of the Ability of a $KMgF_3$ Compound to Purify the $UF_6$ Present in a Gaseous Stream Also Containing $TcF_6$ as an Impurity The present example relates to a test intended to assess the ability of a $KMgF_3$ compound to purify the uranium hexafluoride present in a gaseous stream with regard to the technetium hexafluoride also present in this stream.

As in the previous test, this test is accomplished by using:
rhenium hexafluoride to simulate technetium hexafluoride, as a gaseous blend with uranium hexafluoride; and
a $KMgF_3$ compound in powder form, which has been prepared as described in Example 1 above.

The molar ratio of the rhenium hexafluoride to the uranium hexafluoride is 1/5 ppm.

The test is undertaken using an experimental device which includes mainly and successively a capacity supplied by an intake of $UF_6$ and an intake of $ReF_6$ and in which the gases are blended, an absorption column heated by a heater cable connected to a temperature regulator, and in which the following are placed: the $KMgF_3$ compound, a cold trap enabling the gases to condense at the outlet of the column, a container enabling the gases condensed in this manner to be hydrolysed, and a vacuum pump.

The test is undertaken at 10° C. and at an initial pressure of approximately 200 mbar (20 kPa).

The mass of $KMgF_3$ compound used is 158 mg. The time during which this compound is in contact with the gaseous blend is 158 seconds.

At the end of the test the content of the column containing initially the $KMgF_3$ compound is also hydrolysed to determine the quantities of $ReF_6$ and of $UF_6$ trapped by this compound.

This test shows that the $KMgF_3$ compound retained 75% of the rhenium hexafluoride introduced into the absorption column, but only 0.3% of the $UF_6$ introduced into this column. This corresponds to a decontamination factor equal to 4.

As a comparison, a test undertaken under the same conditions but using magnesium difluoride instead of the $KMgF_3$ compound showed that this magnesium difluoride retains 21% of rhenium hexafluoride (i.e. only one quarter of that retained by the $KMgF_3$ compound) and 17% of uranium hexafluoride (i.e. a quantity 57 times higher than that retained by the $KMgF_3$ compound). In this case, the decontamination factor is only 1.3.

Example 5

Assessment of the Ability of a $KMgF_3$ Compound to Purify the $UF_6$ Present in a Gaseous Stream Also Containing $VOF_3$ as an Impurity By means of an experimental device based on the same principle as the one used in Example 4 above, in this case the ability of a $KMgF_3$ compound to purify the uranium hexafluoride present in a gaseous stream with regard to the vanadium trifluoride oxide also present in this stream is assessed.

To accomplish this, after having filled an absorption column with 140 mg of a $KMgF_3$ compound in powder form, and which was synthesised as described in Example 1 above, a gaseous stream including uranium hexafluoride contaminated by 5900 ppm of vanadium trifluoride oxide is made to flow in the column.

The time during which the $KMgF_3$ compound and the gaseous flow are in contact is 55 seconds.

The experiment is undertaken at 100, 150 and 200° C.

The hydrolysis of the condensed gases and of the content of the column shows that, for each of these temperatures, the $KMgF_3$ compound retained more than 99% of the vanadium trifluoride oxide introduced into the absorption column, but only 2.5% of the uranium hexafluoride introduced into this column, which corresponds to a decontamination factor of over 100.

The residual content of vanadium trifluoride oxide of the $ReF_6/UF_6$ blend is, for its part, 30 ppm.

Example 6

Assessment of the Ability of a $KMgF_3$ Compound to Purify the $UF_6$ Present in a Gaseous Stream Also Containing $MoF_6$ as an Impurity This test is similar to the two tests previously described in Examples 4 and 5 above, the impurity considered in this case being molybdenum hexafluoride ($MoF_6$).

After having filled an absorption column with 1.8 g of a $KMgF_3$ compound in powder form, and which was prepared as described in Example 1 above, a gaseous stream including uranium hexafluoride contaminated by 30 ppm of molybdenum hexafluoride is therefore made to flow over this compound.

The time during which the $KMgF_3$ compound and the gaseous flow are in contact is 100 seconds.

The experiment is undertaken at a temperature of 100° C.

At the column outlet the gaseous stream contains only 0.3 ppm of molybdenum hexafluoride, which corresponds to a decontamination factor of 100.

Example 7

Assessment of the Ability of a $KMgF_3$ Compound to Purify the $UF_6$ Present in a Liquid Stream Also Containing $MoF_6$ and $VOF_3$ as Impurities The ability of a $KMgF_3$ compound to purify the uranium hexafluoride present in a liquid stream with regard to molybdenum hexafluoride and vanadium trifluoride oxide also present in the stream is assessed.

This test is undertaken by means of an experimental device based on the same principle as the one used in Example 4 above.

Firstly, 600 mg of a $KMgF_3$ compound, having been prepared as described in Example 1 above, but in the form of pellets 2 mm in diameter, is introduced into an absorption column.

Approximately 30 g of a liquid blend including uranium hexafluoride, 350 ppb of molybdenum hexafluoride and 350 ppb of vanadium trifluoride oxide is poured into this column, this blend having been previously homogenised for 8 hours at 80° C.

This blend flows at a speed of 0.01 cm/s and remains in contact with the pellets of $KMgF_3$ compound for 288 seconds.

This test shows that at the column outlet the liquid blend no longer contains either vanadium trifluoride oxide or molybdenum hexafluoride.

The decontamination factor is equal to 3 and the proportion of uranium hexafluoride retained in the column is 0.6% by mass.

REFERENCE CITED

[1] U.S. Pat. No. 5,826,163

The invention claimed is:

1. A process for trapping a metal, the process comprising contacting a $KMgF_3$ compound with a gaseous or liquid phase comprising a metal fluoride and/or a metal oxyfluoride, such that at least a portion of the metal fluoride and/or the metal oxyfluoride is retained by the $KMgF_3$ compound.

2. The process of claim 1, wherein the metal of the metal fluoride and/or the metal oxyfluoride is at least one selected from the group consisting of technetium, rhenium, vanadium, molybdenum, niobium, tantalum, antimony and titanium.

3. The process of claim 1, wherein the $KMgF_3$ compound has a surface specific area at least equal to 30 $m^2/g$.

4. The process of claim 1, wherein the $KMgF_3$ compound has a surface specific area at most equal to 150 $m^2/g$.

5. The process of claim 1, wherein the $KMgF_3$ compound is in the form of agglomerates, granulates or pellets.

6. The process of claim 5, wherein the $KMgF_3$ compound is in the form of pellets, the largest dimension of which is at most equal to 3 mm.

7. The process of claim 1, wherein the gaseous or liquid phase is also contacted with an additional trapping compound.

8. The process of claim 7, wherein the additional trapping compound is magnesium difluoride.

9. The process of claim 1, further comprising subjecting the KMgF3 compound to a fluoridation treatment prior to the contacting with the gaseous or liquid phase.

10. The process of claim 1, wherein the contacting occurs at a temperature ranging from ambient temperature to 200° C.

11. The process of claim 1, wherein the $KMgF_3$ compound is contacted with the gaseous or liquid phase for a period of at least 20 seconds.

12. The process of claim 11, wherein the $KMgF_3$ compound is contacted with the gaseous phase for a period ranging from 60 to 300 seconds.

13. The process of claim 11, wherein the $KMgF_3$ compound is contacted with the liquid phase for a period ranging from 60 to 600 seconds.

14. The process of claim 1, wherein the $KMgF_3$ compound is prepared by:
reacting a magnesium compound with potassium bifluoride in solution in an alcohol or a blend of alcohols, in the presence of hydrofluoric acid, to form a resulting product, followed by
calcinating the resulting product.

15. The process of claim 1, wherein the $KMgF_3$ compound is prepared by impregnating magnesium difluoride with an aqueous solution comprising potassium fluoride.

16. A method for preparing a $KMgF_3$ compound having a surface specific area at least equal to 30 $m^2/g$ and at most equal to 150 $m^2/g$, the method comprising:

reacting a magnesium compound with potassium bifluoride in solution in an alcohol or a blend of alcohols, in the presence of hydrofluoric acid, to form a resulting product, followed by calcinating the resulting product.

17. A method for preparing a $KMgF_3$ compound having a surface specific area at least equal to 30 $m^2/g$ and at most equal to 150 $m^2/g$, the method comprising impregnating magnesium difluoride with an aqueous solution comprising potassium bifluoride.

18. A process for purifying uranium hexafluoride, the process comprising contacting a $KMgF_3$ compound with a gaseous or liquid phase comprising uranium hexafluoride and a different metal fluoride and/or a metal oxyfluoride, such that at least a portion of the different metal fluoride and/or the metal oxyfluoride is retained by the $KMgF_3$ compound.

19. The process of claim 18, wherein the uranium hexafluoride results from the conversion of natural uranium or the conversion of uranium derived from the reprocessing of spent nuclear fuels.

* * * * *